United States Patent [19]
Saito et al.

[11] Patent Number: 6,156,856
[45] Date of Patent: Dec. 5, 2000

[54] PROPYLENE-ETHYLENE COPOLYMERS PROCESSES FOR THE PRODUCTION THEREOF AND MOLDED ARTICLES MADE THEREFROM

[75] Inventors: Jun Saito, Kimitsu; Naoshi Kawamoto, Ichihara; Akiko Kageyama, Ichikawa; Kouichi Hatada, Ichihara; Yoshiyuki Oogi, Chiba-ken, all of Japan

[73] Assignee: Chisso Corporation, Osaka, Japan

[21] Appl. No.: 09/142,033

[22] PCT Filed: Jan. 10, 1997

[86] PCT No.: PCT/JP97/00038

§ 371 Date: Sep. 1, 1998

§ 102(e) Date: Sep. 1, 1998

[87] PCT Pub. No.: WO98/30614

PCT Pub. Date: Jul. 16, 1998

[51] Int. Cl.⁷ .................................................... C08F 4/06
[52] U.S. Cl. ................................................................ 526/90
[58] Field of Search .............................................. 526/90

[56] References Cited

U.S. PATENT DOCUMENTS

| | | |
|---|---|---|
| 4,931,417 | 6/1990 | Miya et al. . |
| 5,712,323 | 1/1998 | Braga et al. .............................. 522/73 |

FOREIGN PATENT DOCUMENTS

| | | |
|---|---|---|
| 0604917 | 7/1994 | European Pat. Off. . |
| 1-301704 | 12/1989 | Japan . |
| 3-12406 | 1/1991 | Japan . |
| 3-12407 | 1/1991 | Japan . |
| 5-202124 | 8/1993 | Japan . |
| 5202124 | 8/1993 | Japan . |

OTHER PUBLICATIONS

"Excellent Stereoregular Isotactic Polymerizations of Propylene with C2–Symmetric Silylene–Bridged Metallocene Catalysts" by Takaya Mise, Shinya Maya and Hiroshi Yamazaki, The Institute of Physical and Chemical Research, Wako Saitama 351–01; Chemistry Letters, *The Chemical Society of Japan*, 1989, pp. 1853–1856.

"Propylene Homo–and Copolymerization with Ethylene Using an Ethylenebis (1–Indenyl) Zirconium Dichloride and Methylaluminoxane Catalyst System", Toshiyuki Tsutsui, Naoshi Ishimaru, Akira Mizuno, Akinori Toyoda and Norio Kashiwa; *Polymer*, vol. 30, Jul. 1989.

"C NMR Determination of Monomer Sequence Distribution in Ethylene–Propylene Copolymers Prepared with $TiCl^3$–$Al(C^2H^5)^2Cl$", Masahiro Kakugo, Yukio Naito, Kooji Mizunuma, and Tatsuya Miyatake; *Macromolecules*, vol. 15, 1982, pp. 150–152.

*Primary Examiner*—Edward J. Cain
*Attorney, Agent, or Firm*—McDermott, Will & Emery

[57] ABSTRACT

There are provided propylene-ethylene copolymers from which there are made molded articles having excellent heat resistance and films having both low temperature heat-sealing characteristics and stiffness, processes for the production thereof and molded articles. The propylene-ethylene copolymers contain 0.01–15 mol % of an ethylene unit and are characterized by that in the chain structure determined by NMR, triad (PEP), triad (EEE) and a ratio ($N_{\alpha\beta}$) of all α, β-methylene carbons to all propylene units are in the specified range, a weight average molecular weight is 50,000–1,500,000 and a molecular weight distribution (Mw/Mn) is 1.2–3.8. The copolymers can be produced by copolymerizing ethylene and propylene in the presence of a catalyst in which the specified chiral transition metal compound (metallocene) and aluminoxane are combined.

8 Claims, 2 Drawing Sheets

FIG. 2

(A) TRANSITION METAL CATALYST COMPONENT

CHIRAL TRANSITION METAL COMPOUND REPRESENTED BY $Q(C_5H_{4-m}R^1_m)(C_5H_{4-n}R^2_n)MXY$ $(C_5H_{4-m}R^1_m)$ and $(C_5H_{4-n}R^2_n)$ are substituted by cyclopentadienyl, m and n are an integer of 1-3, $R^1$ and $R^2$ are hydrocarbyl of 1-12 carbons, Q is divalent, hydrocarbyl, unsubstituted silylene, hydrocarbon-substituted silylene, M is Ti, Zr, Hf, X and Y are hydrogen, halogen or hydrocarbyl.

(B) ORGANOMETALLIC COMPONENT

ALUMINOXANE

PROPYLENE-ETHYLENE COPOLYMER

Ethylene (C2) : 0.01~15mol%

① $0.0070 \times (C2) - 0.0020 \leq (PEP)$
  $\leq 0.0070 \times (C2) + 0.0130$

② $0 \leq (EEE) \leq 0.00033 \times (C2) + 0.0010$

③ $N\alpha\beta : 0 \sim 1.2$ mol%

④ Mw : 50,000~1,500,000

⑤ Mw/Mn : 1.2~3.8

PROPYLENE-ETHYLENE COPOLYMERS PROCESSES FOR THE PRODUCTION THEREOF AND MOLDED ARTICLES MADE THEREFROM

TECHNICAL FIELD

This invention relates to propylene-ethylene copolymers, and more particularly it relates to propylene-ethylene copolymers having a characteristic ethylene units-chain, very small amounts of inverted propylene units and narrow molecular weight distribution and processes for the production thereof.

The invention also relates to molded articles made from the propylene-ethylene copolymers.

BACKGROUND ART

Prior propylene-ethylene copolymers have been extensively used in the field of films or the like, by utilizing the characteristics of lower crystallizability and lower glass transition point than linear crystalline polypropylene homopolymers. However, the use has been limited in other application fields, and more improved characteristics have been required for use in those applications.

For instance, low temperature heat-sealing characteristics have been required from a standpoint of energy-saving even in the film field as most extensively used. The prior art has employed a method of lowering the melting points of the copolymers with the sacrifice of the film stiffness. Thus it has been strongly demanded to reconcile stiffness and low temperature heat-sealing characteristics which conflict with each other.

These prior propylene-ethylene copolymers are usually produced by copolymerizing ethylene and propylene using a titanium catalyst. However, at improvement in various properties of the propylene-ethylene copolymers produced by such copolymerization method is considered to reach substantially the limit. In recent years, there have been investigated various methods for producing olefin (co)polymers by (co)polymerizing olefins using different catalyst systems in which metallocenes are combined with aluminoxanes.

For instance, Japanese Patent Kokai 3-12406, Japanese Patent Kokai 3-12407 and CHEMISTRY LETTERS, pp. 1853–1856, 1989 disclose that high stereoregular polypropylenes produced by polymerizing propylene using catalysts consisting of silylene-bridged metallocenes having the specific structures and aluminoxanes have narrow molecular weight distributions, high melting points and high rigidities. However, no concrete technique is disclosed therein on propylene-ethylene copolymers.

Further, Tsutsui et al. have considered that, for the propylene-ethylene copolymers produced by copolymerizing propylene and ethylene using an ethylenebis(1-indenyl) zirconium dichloride and methylaluminoxane catalyst system, the stereoregularities thereof defined by the meso— meso triad sequence are the same as those of the copolymers produced with prior titanium-containing catalyst components, but the melting points of said propylene-ethylene copolymers produced with said metallocene and aluminoxane catalyst system are lower than those of the copolymers obtained with the titanium catalyst components, and the causes are due to larger amounts of inverted propylene units in the propylene-ethylene copolymers obtained with the metallocene-aluminoxane catalysts (T. Tsutsui et al., POLYMER, 1989, Vol. 30, 1350). Larger amounts of inverted propylene units are due to the fact that the polymerization of propylene using the titanium catalysts proceeds substantially with 1,2-insertion, whereas the polymerization of propylene using known metallocene catalysts proceeds with 2,1- and 1,3-insertions in a constant ratio.

PROBLEMS TO BE SOLVED BY THE INVENTION

When prior propylene-ethylene copolymers are used for molding materials, e.g., films, it is very difficult to reconcile good stiffness and good low temperature heat-sealing characteristics.

The objects of the present invention are to provide propylene-ethylene copolymers having good stiffness and low temperature heat-sealing characteristics, processes for the production thereof, and molded articles made from said copolymers.

The present inventors have made extensive investigation in an effort to achieve the above-mentioned objects and succeeded in producing propylene-ethylene copolymers having a characteristic ethylene units-chain, very small amounts of inverted propylene units and narrow molecular weight distribution. Further, they have found that the propylene-ethylene copolymers having specific structure produced by the present processes permit the production of films having both good stiffness and good low temperature heat-sealing characteristics and injection molded-articles having better heat resistance, and also that said copolymers have good molding properties, thus leading to the completion of the present invention.

DISCLOSURE OF THE INVENTION

The present first invention is directed to a propylene-ethylene copolymer comprising 0.01–15 mol % of an ethylene unit and 99.99–85 mol % of a propylene unit, characterized in that a) the chain structure determined by NMR has the following relationships, in the unit of three monomers sequence (triad) in the copolymer chain, a-1) the relationship between the ratio of propylene-ethylene-propylene sequence (PEP) and the content of all ethylene units (C2) is represented by equation (I)

$$0.0070 \times C2 - 0.0020 \leq PEP \leq 0.0070 \times C2 + 0.0130 \quad (I)$$

and a-2) the relationship between the ratio of three ethylenes sequence (EEE) and the content of all ethylene units (C2) is represented by equation (II)

$$0 \leq EEE \leq 0.00033 \times C2 + 0.0010 \quad (II)$$

a-3) a ratio ($N_{\alpha\beta}$) of all $\alpha,\beta$-methylene carbons to all propylene units is in the range of 0–1.2 mol %, b) a weight average molecular weight (Mw) is 50,000–1,500,000, and c) a ratio (Mw/Mn) of the weight average molecular weight (Mw) to a number average molecular weight (Mn) is 1.2–3.8.

The second invention is directed to a process for the production of the propylene-ethylene copolymer of the first invention, characterized in that ethylene and propylene are copolymerized in the presence of a catalyst comprising a chiral transition metal compound and an aluminoxane, the transition metal compound being represented by formula (1)

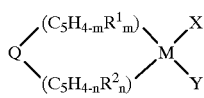

(1)

wherein M represents a transition metal selected from the group consisting of titanium, zirconium and hafnium; X and Y may be the same or different and each represents a hydrogen, a halogen or a hydrocarbyl radical; $(C_5H_{4-m}R^1_m)$ and $(C_5H_{4-n}R^2_n)$ represent a substituted cyclopentadienyl group in which $R^1$ and $R^2$ may be the same or different and each represents a hydrocarbyl radical of 1 to 20 carbons which may be joined with two carbon atoms on the cyclopentadienyl ring to form one or more hydrocarbon ring which may be substituted by a hydrocarbyl radical, or a silicone-containing hydrocarbyl radical; m and n are an integer of 1–3; and Q is a divalent group capable of linking $(C_5H_{4-m}R^1_m)$ and $(C_5H_{4-n}R^2_n)$, which is selected from the group consisting of a hydrocarbyl radical, an unsubstituted silylene group and a hydrocarbyl-substituted silylene group.

Further, the third invention is directed to a molded article characterized by molding the propylene-ethylene copolymer of the first invention as a molding material.

BRIEF DESCRIPTION OF THE DRAWINGS

FIG. 2 shows a flow sheet of the process for the production of the present propylene-ethylene copolymer.

BEST FORM FOR THE PRACTICE OF THE INVENTION

Figure 1:
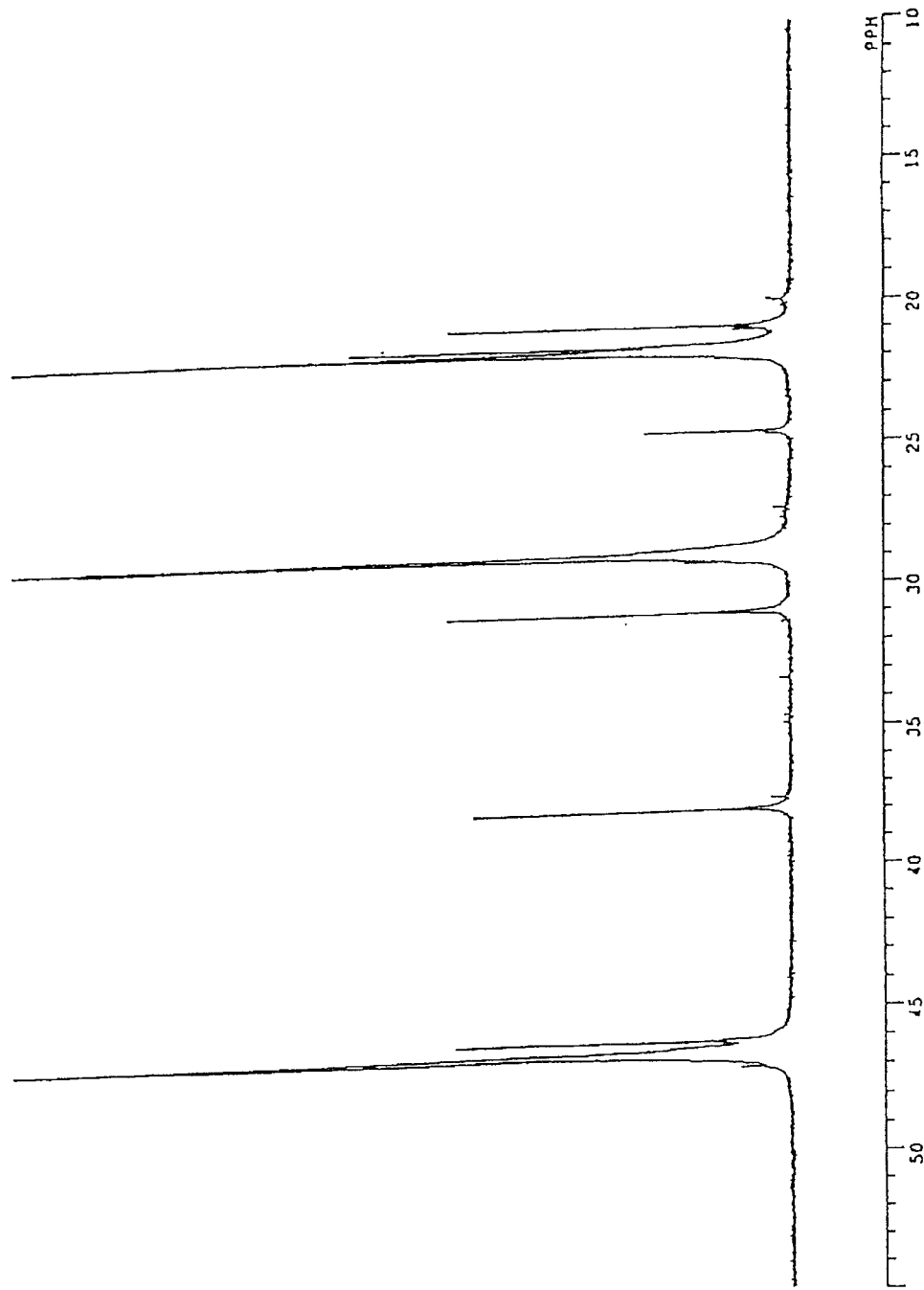
FIG. 1 shows $^{13}C$ NMR spectrum of the present propylene-ethylene copolymer produced in Example 1.

In the propylene-ethylene copolymer of the first invention, the chain structure of the copolymer, i.e., the content of all ethylene units (C2), the ratios of three monomers sequences (PEP) and (EEE) and all α,β-methylene carbons are the values calculated from the results determined at 67.20 MHz and 130° C. by $^{13}C$ NMR spectroscopy using a mixed solution of o-dichlorobenzene/benzene bromide with 8/2 weight ratio having 20% by weight of polymer concentration. As the measuring apparatus, for example, JEOL-GX270 spectrometer (manufactured by Nihon Densi K. K. in Japan) can be used.

The propylene-ethylene copolymers of the first invention are those containing the ethylene unit of 0.01–15 mol %, preferably 0.05–12 mol %, especially preferably 0.05–10 mol %. With less than 0.01 mol % of all ethylene units content, inherent characteristics of the copolymer are lost. With exceeding 15 mol %, the crystallizability of the copolymer lowers, thus leading to lowered heat resistance.

By the terms of "ratio of propylene-ethylene-propylene sequence (PEP)" and "ratio of three ethylenes sequence (EEE)" in the unit of three monomers sequence (triad) in the propylene-ethylene copolymer chain as used herein, are meant respectively, the case where the sequence of propylene and ethylene forms "the ratio distributed in the sequence of propylene-ethylene-propylene (PEP)" and "the ratio distributed in the sequence of ethylene-ethylene-ethylene (EEE)" in the triad distribution in the propylene-ethylene copolymer chain determined by $^{13}C$ NMR spectroscopy proposed by Kakugo et al. (Macromolecules 1982, 15, 1150–1152). In the first invention, deciding the peak assignment in the determination of $^{13}C$ NMR spectra is based on the above proposal of Kakugo et al.

In the propylene-ethylene copolymer of the first invention, the ratio of propylene-ethylene-propylene (PEP) is a presence ratio of the sequence unit distributed in the sequence of propylene-ethylene-propylene to all triad units, when the sequence unit (triad) distributed in the sequence of three successive monomers is considered in all propylene and ethylene units in the copolymer chain. The higher the triad (PEP), the ratio of an isolated ethylene unit interposed between the propylene units, i.e., the randomness is higher.

In the propylene-ethylene copolymer of the first invention, the ratio of propylene-ethylene-propylene sequence (PEP) has the relationship represented by equation (I)

$$0.0070 \times C2 - 0.0020 \leq PEP \leq 0.0070 \times C2 + 0.0130 \qquad (I)$$

preferably by equation (I')

$$0.0070 \times C2 \leq PEP \leq 0.0070 \times C2 + 0.011 \qquad (I')$$

and particularly preferably by equation (II")

$$0.0070 \times C2 \leq PEP \leq 0.0070 \times C2 + 0.0090 \qquad (II')$$

in regard to the content of all ethylene units (C2, unit: mol %) in the copolymer.

The propylene-ethylene copolymers wherein the ratio of propylene-ethylene-propylene sequence (PEP) is much higher than the value represented by equation (I) have not been found in the technical scope of the present invention. On the other hand, if the (PEP) ratio is too low, the low temperature heat-sealing characteristics of the films made from the copolymer deteriorate.

On one hand, the ratio of three ethylenes sequence (EEE) is a presence ratio of the chain distributed in the sequence of ethylene-ethylene-ethylene to all triad units, when the sequence unit(triad) distributed in the sequence of three successive monomers is considered in all propylene and ethylene units in the copolymer chain. The higher the triad (EEE), the ratio of the ethylene unit present in the form of block in the copolymer is higher.

In the propylene-ethylene copolymer of the first invention, the ratio of ethylene-ethylene-ethylene sequence (EEE) has the relationship represented by equation (II)

$$0 \leq EEE \leq 0.00033 \times C2 + 0.0010 \qquad (II)$$

preferably by equation (II')

$$0.0033 \times C2 - 0.0028 \leq EEE \leq 0.0033 \times C2 + 0.0005 \qquad (II')$$

and particularly preferably by equation (II")

$$0.0033 \times C2 - 0.0022 \leq EEE \leq 0.0033 \times C2 \qquad (II'')$$

in regard to the content of all ethylene units (C2, unit: mol %) in the copolymer.

If the ratio of ethylene-ethylene-ethylene sequence (EEE) is much higher than the range represented by equation (II), the low temperature heat-sealing characteristics of the films made from the copolymer deteriorate. On the other hand, the case where the (EEE) ratio is too low has not been found in the technical scope of the present invention.

The ratio ($N_{\alpha\beta}$) of all α,β-methylene carbons to the content of all propylene units (C3) as defined herein is a presence ratio ($N_{\alpha\beta}$, unit: mol %) of all α,β-methylene carbons to the content of all propylene units (C3), in the propylene-ethylene copolymer chain determined by $^{13}C$ NMR spectroscopy in accordance with the method proposed by T. Tsutsui et al., in POLYMER, 1989, Vol.30, 1350. The ratio in the present invention shows 100 times the value defined by $N_{\alpha\beta}$ in the above Tsutsui's reference. This ratio ($N_{\alpha\beta}$) is based on the spectra of $\alpha,\beta$-methylene carbons due to 1,2-insertion of propylene and insertion of ethylene subsequent to 2,1-insertion of propylene, which reflects the content of inverted units due to 2,1-insertion of propylene in the copolymer.

In the propylene-ethylene copolymer of the first invention, the ratio ($N_{\alpha\beta}$) of all $\alpha,\beta$-methylene carbons(unit: mol) to the content of all propylene units (C3, unit: mol) in the copolymer chain is in the range of 0–1.2 mol %, preferably 0–0.5 mol %, particularly preferably 0–0.2 mol %. If the ratio ($N_{\alpha\beta}$) of all a, p-methylene carbons (unit: mol) to the content of all propylene units (C3, unit: mol) in the copolymer chain is too high, the stiffness and heat resistance of the molded article made from the copolymer lower.

The propylene-ethylene copolymers of the first invention have the chain structure of the copolymer chain in which there is almost no inverted propylene unit and the ethylene unit is more randomly distributed in the copolymer.

The weight average molecular weight (Mw) and the number average molecular weight (Mn) of the propylene-ethylene copolymer in the present first invention are based on the results determined at 135° C. by a gel permeation chromatography (GPC) using an o-dichlorobenzene solution with 0.05% by weight of a polymer concentration and a mixed polystyrene gel column, e.g., TSK gel GMH6-HT available from Toso K. K. in Japan. As a measuring device, GPC-150C manufactured by Waters Co. Ltd. can be used for instance.

The propylene-ethylene copolymers of the first invention have the weight average molecular weight (Mw) in the range of 50,000–1,500,000, preferably 100,000–1,000,000.

If the weight average molecular weight (Mw) is too high, the melt flow property of the copolymer lowers, with the result of lowered moldability. If it is too low, the strength of the molded article lowers.

For the propylene-ethylene copolymer of the first invention, the ratio (Mw/Mn) of the weight average molecular weight (Mw) to a number average molecular weight (Mn) is 1.2–3.8, preferably 1.5–3.5.

The ratio (Mw/Mn) of the weight average molecular weight (Mw) to the number average molecular weight (Mn) is a measure of a molecular weight distribution. If the ratio (Mw/Mn) is too high, the molecular weight distribution becomes too broad, which leads to the deterioration of the low temperature heat-sealing characteristics of the films made from the copolymer. The propylene-ethylene copolymers having less than 1.2 of the ratio (Mw/Mn) have not yet been found in the technical scope of the present invention.

The propylene-ethylene copolymers of the present first invention, due to their structural characteristics have the relationship between the melting point (Tm) of the copolymer and the content of all ethylene units (C2, unit: mol %) in the copolymer which is represented by equation (III)

$$-8.1 \times C2 + 156.0 \leq Tm \leq -4.4 \times C2 + 165.0 \quad \text{(III)}$$

and depending on the structural conditions, the relationship represented by equation (III')

$$-7.2 \times C2 + 156.0 \leq Tm \leq -4.9 \times C2 + 165.0 \quad \text{(III')}$$

and further the relationship represented by equation (III")

$$-6.3 \times C2 + 156.0 \leq Tm \leq -5.4 \times C2 + 165.0 \quad \text{(III")}$$

The melting point as referred to herein is a temperature showing a peak on melting which was determined by heating propylene-ethylene copolymer from room temperature to 230° C. at a rate of 30° C./min, keeping it at the same temperature for 10 minutes, followed by cooling down to −20° C. at a rate of −20° C./min, keeping it at the same temperature for 10 minutes and heating again it at a rate of 20° C./min, using a DSC 7 type differential scanning calorimeter manufactured by Perkin Elmer Co.

The processes of producing the propylene-ethylene copolymers of the first invention are not limited, if the propylene-ethylene copolymers thus produced satisfy each of the requirements as mentioned above. The processes using the specified metallocene catalysts of the second invention are preferred.

In the present second invention, a combination of chiral transition metal compounds as the specified metallocene and aluminoxanes is used as a catalyst.

Those which can be used as the metallocene can include chiral transition metal compounds represented by formula (1)

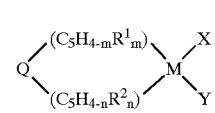

(1)

wherein M represents a transition metal selected from the group consisting of titanium, zirconium and hafnium; X and Y may be the same or different and each represents a hydrogen, a halogen or a hydrocarbyl radical; $(C_5H_{4-m}R^1_m)$ and $(C_5H_{4-n}R^2_n)$ represent a substituted cyclopentadienyl group in which $R^1$ and $R^2$ may be the same or different and each represents a hydrocarbyl radical of 1 to 20 carbons which may be joined with two carbon atoms on the cyclopentadienyl ring to form one or more hydrocarbon ring which may be substituted by a hydrocarbyl radical, or a silicone-containing hydrocarbyl radical; m and n are an integer of 1–3; and Q is a divalent group capable of linking $(C_5H_{4-m}R^1_m)$ and $(C_5H_{4-n}R^2_n)$, which is selected from the group consisting of a hydrocarbyl radical, an unsubstituted silylene group and a hydrocarbyl-substituted silylene group.

Preferable are the chiral transition metal compounds of formula (1) wherein M is zirconium or hafnium, $R^1$ and $R^2$ are the same or different alkyl group of 1 to 20 carbons, X and Y are the same or different halogen atom or hydrocarbyl group and Q is dialkylsilylene group.

Concrete examples of the chiral transition metal compounds represented by formula (1) can include:

rac-Dimethylsilylene bis(2-methyl-4,5,6,7-tetrahydroindenyl)zirconium dichloride,
rac-Dimethylsilylene bis(2-methyl-4,5,6,7-tetrahydroindenyl)zirconium dimethyl,
rac-Ethylene bis(2-methyl-4,5,6,7-tetrahydroindenyl) hafnium dichloride,
rac-Dimethylsilylene bis(2-methyl-4-phenylindenyl) zirconium dichloride,
rac-Dimethylsilylene bis(2-methyl-4-phenylindenyl) zirconium dimethyl,
rac-Dimethylsilylene bis(2-methyl-4-phenylindenyl) hafnium dichloride,
Dimethylsilylene(2,4-dimethylcyclopentadienyl)(3',5'-dimethylcyclopentadienyl)titanium dichloride,
Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dichloride, Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,4-dimethylcyclopentadienyl)(3',5'-dimethylcyclopentadienyl)hafnium dimethyl,
Dimethylsilylene(2,3,5-trimethylcyclopentadienyl)(2',4',5'-trimethylcyclopentadienyl)titanium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride, and
Dimethylsilylene(2,3,5-trimethylcyclopentadienyl)(2',4',5'-trimethylcyclopentadienyl)hafnium dimethyl.

Of these metallocenes, especially preferred are the following compounds:

Dimethylsilylene(2,4-dimethylcyclopentadienyl)(3',5'-dimethylcyclopentadienyl)zirconium dichloride,
Dimethylsilylene(2,4-dimethylcyclopentadienyl)(3',5'-dimethylcyclopentadienyl)zirconium dimethyl,
Dimethylsilylene(2,4-dimethylcyclopentadienyl)(3',5'-dimethylcyclopentadienyl)hafnium dichloride,
Dimethylsilylene(2,3,5-trimethylcyclopentadienyl)(2',4',5'-trimethylcyclopentadienyl)zirconium dichloride,
Dimethylsilylene(2,3,5-trimethylcyclopentadienyl)(2',4',5'-trimethylcyclopentadienyl)zirconium dimethyl,
Dimethylsilylene(2,3,5-trimethylcyclopentadienyl)(2',4',5'-trimethylcyclopentadienyl)hafnium dichloride,
and
Dimethylsilylene(2,3,5-trimethylcyclopentadienyl)(2',4',5'-trimethylcyclopentadienyl)hafnium dimethyl.

In the synthesis of these chiral metallocenes, a metallocene of meso form in a non-chiral structure may be formed as a by-product. In the practical use, however, all are not required to be chiral metallocenes and the meso form may be mixed. When a mixture with the meso form is used, there may be the case where the atactic polymer polymerized from the meso form is required to be removed by known process, e.g., solvent extraction or the like, so that the resulting propylene-ethylene copolymers may meet the essential requirements of the present first invention, but depending on the proportion of the meso form mixed and the propylene-ethylene copolymerization activity.

Those chiral metallocenes can be formed in combination with aluminoxanes into a catalyst, but may be supported on a finely divided carrier. The finely divided carriers include inorganic or organic compounds, for which here are used finely divided solids in the form of granules or spheres having a particle diameter of 5–300 μm, preferably 10–200 μm.

The inorganic compounds used for the carrier can include $SiO_2$, $Al_2O_3$, $MgO$, $TiO_2$, $ZnO$ or the mixtures thereof, e.g., $SiO_2$—$Al_2O_3$, $SiO_2$—$MgO$, $SiO_2$—$TiO_2$, $SiO_2$—$Al_2O_3$—$MgO$. Of these compounds, those comprising $SiO_2$ or $Al_2O_3$ as a main component are preferred.

The organic compounds used for the carrier can include polymers or copolymers of α-olefin of 2-12 carbons such as ethylene, propylene, 1-butene, 4-methyl-1-pentene, and polymer or copolymer of styrene.

Aluminoxanes which are combined as a catalyst component with the chiral transition metal compounds in the process of producing propylene-ethylene copolymers according to the present second invention, include organoaluminum compounds represented by the following formula (2) or (3).

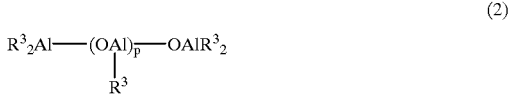

wherein $R^3$ represents a hydrocarbyl radical of 1 to 6 carbons, preferably 1 to 4 carbons, which can concretely include an alkyl group such as methyl, ethyl, propyl, butyl, isobutyl, pentyl, hexyl; an alkenyl group such as allyl, 2-methylallyl, propenyl, isopropenyl, 2-methyl-1-propenyl, butenyl; a cycloalkyl group such as cyclopropyl, cyclobutyl, cyclopentyl, cyclohexyl; and an aryl group. Of these, the alkyl group is especially preferred and each $R^3$ may be identical or different.

p is an integer of 4 to 30, preferably 6 to 30, especially preferably 8 to 30.

These aluminoxanes can be used singly or in combination of two or more. Also, they can be used in admixture with aluminum alkyls such as trimethyl aluminum, triethyl aluminum, tri-isopropyl aluminum, tri-isobutyl aluminum, dimethyl aluminum chloride.

The aluminoxanes can be prepared under various known conditions. More specifically, the following methods can be illustrated:

(1) a method of reacting a trialkyl aluminum directly with water, using an organic solvent such as toluene, ether;

(2) a method of reacting an trialkyl aluminum with salts containing water of crystallization such as copper sulfate hydrate, aluminum sulfate hydrate;

(3) a method of reacting an trialkyl aluminum with water impregnated in silica gel or the like;

(4) a method of reacting a mixture of trimethyl aluminum and tri-isobutyl aluminum directly with water, using an organic solvent;

(5) a method of reacting a mixture of trimethyl aluminum and tri-isobutyl aluminum with salts containing water of crystallization such as copper sulfate hydrate, aluminum sulfate hydrate; and (6) a method of reacting tri-isobutyl aluminum with water impregnated in silica gel, followed by reacting with trimethyl aluminum.

In the process for the production of the propylene-ethylene copolymers according to the second invention, a combination of the metallocenes and the aluminoxanes is used as the catalyst. The proportion of each catalyst component used is in such a range that an aluminum atom in aluminoxane is 10–100,000 mols, preferably 50–50,000 mols, especially preferably 100–30,000 mols per mol of a transition metal atom in the metallocene.

In the second invention, the propylene-ethylene copolymers of the first invention can be produced by the copolymerization of propylene and ethylene in the presence of the catalyst consisting of the above combination. As the polymerization processes can be used known (co)polymerization processes of propylene. Those processes can include a slurry copolymerization wherein propylene and ethylene are polymerized in an inert solvent including an aliphatic hydrocarbon such as butane, pentane, hexane, heptane, isooctane; an alicyclic hydrocarbon such as cyclopentane, cyclohexane, methylcyclohexane; an aromatic hydrocarbon such as toluene, xylene, ethylbenzene; and gasoline fraction and hydrogenated diesel oil; a bulk copolymerization wherein propylene itself is used as a solvent; and a gas phase copolymerization wherein propylene and ethylene are copolymerized in a gas phase.

The copolymerization can be carried out by any of continuous, batchwise and semi-batchwise processes.

In the copolymerization of propylene and ethylene, the above-mentioned catalysts may be fed to a copolymerization reaction system in the form of a mixture obtained by previously mixing both components of metallocene and aluminoxane in the inert solvent, or alternatively metallocene and aluminoxane may be separately fed to the reaction system. Prior to the copolymerization of propylene and etylene, the catalyst consisting of combination of metallocene and aluminoxane may be pre-activated by the polymerization reaction of said catalyst with small amounts of $\alpha$-olefins, more specifically about 0.001–10 kg of $\alpha$-olefins per mole of the transition metal in metallocene, and subsequently the polymerization of propylene and ethylene can be carried out. This procedure is effective in obtaining a final propylene-ethylene copolymer in good particular form.

As $\alpha$-olefins which can be used in the pre-activation of the catalysts, there are preferably used those of 2-12 carbons which can concretely include ethylene, propylene, butene, pentene, hexene, octene, 4-methyl-1-pentene or the like. In particular, ethylene, propylene and 4-methyl-1-pentene are preferably used.

In the second invention, propylene and ethylene are copolymerized by the above-mentioned polymerization processes in the presence of the above-mentioned catalysts or the preactivated catalysts. As the copolymerization conditions can be employed similar conditions to those in the polymerization of propylene according to known conventional Ziegler catalysts. More specifically, at the polymerization temperature of $-50$–$150°$ C., preferably $-10$–$100°$ C. and the polymerization pressure of an atmospheric pressure-7 MPa, preferably 0.2–5 MPa, propylene and ethylene are fed to a polymerization reactor and then copolymerized, usually for a period of about one minute to about 20 hours.

In the copolymerization, hydrogen can be added in a suitable amount for controlling the molecular weight as in the prior copolymerization processes.

After completion of the copolymerization of propylene and ethylene, known after-treatments such as deactivation of the catalyst, removal of the catalyst residue, drying of the product or the like may be carried out if necessary, to produce the propylene-ethylene copolymers of the first invention.

In the processes of producing the propylene-ethylene copolymers of the second invention wherein ethylene and propylene are copolymerized in the presence of the catalyst of the combined metallocene and aluminoxane, the insertion reaction of propylene is controlled to 1,2-insertion with no almost occurrence of any inverse insertion of propylene, and successive insertion of ethylene is inhibited in the insertion reaction of ethylene, so that the ethylene unit is more randomly distributed in the copolymer.

According to the processes of the second invention for the production of propylene-ethylene copolymers, there are produced propylene-ethylene copolymers having a monomer chain supporting more randomly distributed ethylene unit, very small amounts of inverted propylene units and narrow molecular weight distribution.

In the molded articles of the third invention, the propylene-ethylene copolymers of the first invention can be served as molding materials in the form of powders or pellets, by compounding with various additives such as antioxidants, ultraviolet absorbing agents, antistatic agents, nucleating agents, lubricants, flame retardants, antiblocking agents, colorants, inorganic or organic fillers or the like or further various synthetic resins, if necessary to form powders, or alternatively by heat melting and kneading the compounds at 190–350° C. for a period of from about 20 seconds to 30 minutes and cutting into particulates to form pellets.

As the molding methods can be used known processes for the molding of polypropylene such as injection molding, extrusion molding, foam molding, blow molding or the like, by which there can be produced various types of moldings such as industrial injection molded parts, various containers, unstretched or stretched films, biaxially oriented films, sheets, pipes, fibers and the like.

EXAMPLE

The invention is further illustrated by the following examples and comparative examples.

Example 1

1) Production of propylene-ethylene copolymer

A 100 dm$^3$ stainless polymerization reactor equipped with an agitator having a tilted impeller was purged with nitrogen gas and charged at 20° C. with 50 dm$^3$ of n-hexane, 2.0 mol (in terms of Al atom) of a tolune solution of methyl aluminoxane (concentration: 2 mol/dm$^3$, available from Toso-Aczo Co. Ltd. under the trade name of MMAO) and a mixture of 0.09 mmol chiral dimethylsilylene(2,3,5-trimethylcyclopentadienyl)(2',4',5'-trimethylcyclopentadienyl)hafnium dichloride and 0.01 mmol meso dimethylsilylene(2,3,5-trimethyl cyclopentadienyl)(2',3',5'-trimethylcyclopentadienyl) hafnium dichloride together with 0.5 dM$^3$ of toluene.

After the internal temperature of the polymerization reactor was elevated to 45° C., a mixed gas of 93.9 mol % propylene, 6.0 mol % ethylene and 0.1 mol % hydrogen was continuously fed to the polymerization reactor at a rate of 8 dm$^3$/min, while keeping the internal temperature of the reactor at 45° C. and continuously discharging out of the reactor a portion of the mixed gas present at the gas phase portion within the reactor through a valve mounted to the reactor so that the pressure at the gas phase portion within the reactor was kept at 0.4 MPa, whereby ethylene and propylene were copolymerized for 4 hours.

After completion of the polymerization, unreacted propylene, ethylene and hydrogen were discharged from the polymerization reactor, 3 dm$^3$ of 2-propanol was charged into the reactor and stirred at 30° C. for 10 minutes to deactivate the catalyst. Subsequently, 0.2 dm$^3$ of an aqueous solution of hydrogen chloride (concentration: 12 mol/dm$^3$) and 8 dm$^3$ of methanol were added and the treatment was performed at 60° C. for 30 minutes. After completion of the treatment, stirring was ceased to remove an aqueous phase portion from the bottom of the reactor and the same amounts of an aqueous hydrogen chloride solution and methanol were added to repeat a similar operation. 0.02 dm$^3$ of an aqueous sodium hydroxide solution (concentration: 5 mol/dm$^3$), 2 dm$^3$ of water and 2 dm$^3$ of methanol were added and stirring was continuted at 30° C. for 10 minutes. After the treatment, stirring was ceased to remove an aqueous phase portion from the bottom of the reactor. 8 dm³ of water was further added, stirring was continuted at 30° C. for 10 minutes and the operation to remove the aqueous phase portion was repeated twice. A polymer slurry was taken out of the polymerization reactor, filtered and dried to prepare 2.4 kg of propylene-ethylene copolymer which was used as an evaluation sample in Example 1.

Example 2

The propylene-ethylene copolymer was produced under the same conditions as in Example 1, provided that 50 dm³ of toluene was substituted for n-hexane used as a solvent for polymerization in Example 1, the composition of a mixed gas fed to the polymerization reactor comprised 90.5 mol % propylene, 9.5 mol % ethylene and 0 mol % hydrogen and the polymerization temperature was 30° C. The copolymer thus produced was served as a sample for evaluation in Example 2.

Example 3

The propylene-ethylene copolymer was produced under the same conditions as in Example 1, provided that the composition of a mixed gas fed to the polymerization reactor comprised 96.8 mol % propylene, 3.2 mol % ethylene and 0 mol % hydrogen and the polymerization temperature was 50° C. The copolymer thus produced was served as a sample for evaluation in Example 3.

Example 4

The propylene-ethylene copolymer was produced under the same conditions as in Example 1, provided that 50 dm³ of toluene was substituted for n-hexane used as a solvent for polymerization in Example 1 and the composition of a mixed gas fed to the polymerization reactor comprised 84.8 mol % propylene, 15.1 mol % ethylene and 0.1 mol % hydrogen. The copolymer thus produced was served as a sample for evaluation in Example 4.

Example 5

Copolymerization of propylene and ethylene and purification of the copolymer were carried out under the same conditions as in Example 4, provided that a mixture of 0.09 mmol chiral dimethylsilylene(2,3,5-trimethylcyclopentadienyl)(2',4',5'-trimethylcyclopentadienyl)zirconium dichloride and 0.01 mmol meso dimethylsilylene(2,3,5-trimethyl cyclopentadienyl)(2',3',5'-trimethylcyclopentadienyl) zirconium dichloride was used as metallocene and the composition of the mixed gas fed to the polymerization reactor comprised 91.1 mol % propylene, 8.8 mol % ethylene and 0.1 mol % hydrogen. Subsequently, the solvent portion containing the copolymers was removed from the polymerization reactor.

The whole copolymers were found to be dissolved in the solvent as removed above. This solution was charged into the apparatus for distilling off the solvent under reduced pressure, by which 95% of toluene were distilled off at 70° C. under reduced pressure. To the cooled solution at 25° C. was charged 20 dm³ of methanol to precipitate the copolymer which was then filtered and dried, thus producing a propylene-ethylene copolymer served as a sample for evaluation in Example 5.

Comparative Example 1

The propylene-ethylene copolymer was produced in a similar manner as in Example 1, provided that the catalyst (combination of metallocene and methylaluminoxane) used in Example 1 was replaced by the catalyst comprising 0.28 mmol (in terms of Ti) of a titanium catalyst component carried on magnesium chloride, 80 mmol of triethyl aluminum and 8 mmol of diisopropyldimethoxysilane as a third component of the catalyst, 0.5 mol of hydrogen was charged into a polymerization reactor prior to feeding a mixed gas of propylene and ethylene to the reactor, the mixed gas of 93.4 mol % propylene and 6.6 mol % ethylene was fed to the polymerization reactor for a period of 2 hrs. at a feed rate capable of keeping the polymerization pressure at 0.69 MPa and the polymerization temperature was 60° C. The copolymer thus produced was served as a sample for evaluation in Comparative Example 1.

Comparative Example 2

Copolymerization of propylene and ethylene and purification of the copolymer were carried out under the same conditions as in Example 1, provided that a mixture of 0.09 mmol of chiral, rac-ethylene bis(indenyl)hafnium dichloride and 0.01 mmol of meso-ethylene bis(indenyl)hafnium dichloride was used as metallocene. The solvent portion containing the copolymer was removed from the polymerization reactor and the whole copolymers were found to be dissolved in the solvent. Subsequently, distilling off the solvent under reduced pressure, precipitating out the copolymer with methanol, filtration and drying were carried out in a similar manner as in Example 5 to produce a propylene-ethylene copolymer which was served as a sample for evaluation in Comparative Example 2.

2) Evaluation for physical properties of propylene-ethylene copolymers

Each of the samples produced in Examples 1–5 as well as Comparative Examples 1 and 2 was determined for the following physical properties.

a) Content of all ethylene units: Determined by $^{13}$C NMR spectroscopy (unit: mol %).

b) Triad (PEP): Ratio of "propylene-ethylene-propylene sequence" in the unit of three monomers sequence (triad) in the copolymer chain, which was determined by $^{13}$C NMR spectroscopy.

c) Triad (EEE): Ratio of "ethylene-ethylene-ethylene sequence" in the unit of three monomers sequence (triad) in the copolymer chain, which was determined by $^{13}$C NMR spectroscopy.

d) Ratio ($N_{\alpha\beta}$) of all α,β-methylene carbons to all propylene units (C3): Determined by $^{13}$C NMR spectroscopy (unit: mol %).

e) Weight average molecular weight (Mw): Determined by GPC.

f) Number average molecular weight: Determined by GPC.

g) Melting point (Tm): It was determined by GPC (unit: °C.)

TABLE 1

|  | Example | | | | | Comparative Example | |
|---|---|---|---|---|---|---|---|
|  | 1 | 2 | 3 | 4 | 5 | 1 | 2 |
| Content of all ethylene units (mol %) | 3.22 | 4.41 | 2.05 | 7.14 | 14.3 | 6.50 | 4.88 |
| Triad (PEP) (×10$^2$) | 2.78 | 3.69 | 1.66 | 5.70 | 10.44 | 4.60 | 4.00 |
| Triad (EEE) (×10$^2$) | 0.00 | 0.06 | 0.00 | 0.12 | 0.34 | 0.40 | 0.06 |
| Ratio $N_{\alpha\beta}$ (mol %) | 0.07 | 0.07 | 0.07 | 0.08 | 0.20 | <0.01 | 1.41 |
| Weight average molecular weight (Mw) (×10$^4$) | 18.9 | 90.0 | 18.5 | 35.3 | 7.2 | 19.0 | 25.8 |
| Molecular weight ratio (Mw/Mn) | 2.3 | 2.8 | 2.2 | 1.7 | 2.2 | 4.1 | 2.0 |
| Melting Point (Tm) (° C.) | 139.7 | 137.4 | 150.0 | 116.1 | 115.3 | 139.5 | 109.5 |

3) Injection molding of propylene-ethylene copolymers

Example 6

100 Parts by weight of the propylene-ethylene copolymer produced in Example 1 were mixed with 0.1 part by weight of tetraxis[methylene-3-(3',5'-di-tert. butyl-4'-hydroxyphenyl)propionate]methane and 0.1 part by weight of calcium stearate. This mixture was extruded into copolymer pellets using a single screw extruder with a screw diameter of 40 mm which was set at an extrusion temperature of 230° C. The resultant pellets were injection molded at a resin melting temperature of 230° C. and a mold temperature of 50° C. using an injection molding machine to form a JIS type test piece.

Comparative Example 3

A JIS type test piece was prepared by treating the copolymer under the same conditions as in Example 6, but using the propylene-ethylene copolymer produced in Comparative Example 1.

4) Evaluation for heat resistance of molded articles

The test pieces prepared in Example 6 and Comparative Example 3 were allowed to stand in a room at a relative humidity of 50% and a room temperature of 23° C. for 72 hours and then determined for a heat distortion temperature (HDT)(unit: °C.) at a flexture stress of 45.1 N/cm$^2$ in accordance with JIS K7207 to evaluate the heat resistance.

The heat distortion temperatures (HDT) of the test pieces of Example 6 and Comparative Example 3 were 101° C. and 95° C., respectively.

Higher heat distortion temperature (HDT) exhibits better heat resistance.

5) Formation of propylene-ethylene copolymer films

Example 7

100 Parts by weight of the propylene-ethylene copolymer produced in Example 1 were mixed with 0.1 part by weight of tris(2,4-di-tert.butyl phenyl)phosphite, 0.05 part by weight of tetraxis[methylene-3-(3',5'-di-tert.butyl-4'-hydroxyphenyl)propionate]methane and 0.08 part by weight of calcium stearate. This mixture was extruded into copolymer pellets using a single screw extruder with a screw diameter of 40 mm which was set at an extrusion temperature of 230° C. The resultant pellets were formed into a film with a thickness of 25 μm and a width of 300 mm by a T-die method under the conditions: melt extrusion temperature 210° C., cooling roll temperature 30° C. and line speed 20 m/min.

Comparative Example 4

A film with a thickness of 25 μm and a width of 300 mm was formed by a T-die method under the same conditions as in Example 7, but using the propylene-ethylene copolymer produced in Comparative Example 1.

6) Test for evaluating films

The films formed in Example 7 and Comparative Example 4 were determined for the heat-seal temperature and Young's modulus (Machine Direction: MD, Transverse Direction: TD) according to the following methods.

a) Heat-seal temperature: The films were heat-sealed under the conditions of a seal pressure, 0.098 MPa and a seal time, 1 sec., using a thermal gradient type seal temperature measuring device (manufactured by Toyo Seiki Co. Ltd.). The heat-sealed film was cut into a test piece with the width of 15 mm. The test piece was subjected to a tensile test at a tensile speed of 300 mm/min, in such a manner that the heat-sealed area was placed in the middle of the machine. The stress at rupture of the film was expressed as a heat-seal strength of the film and a heat-seal temperature (unit: °C.) was determined necessary to reach a heat-seal strength of 0.027 MPa/15 mm.

b) Young's modulus: The tensile strength (unit: N/mm$^2$) was determined in the direction of MD (Machine Direction)/TD (Transverse Direction) according to ASTM D882.

The determined results on the heat-seal temperature and Young's modulus of the films formed in Example 7 and Comparative Example 4 are shown below.

TABLE 2

|  | Heat-seal Temperature (° C.) | Young's Modulus (N/mm$^2$) | |
|---|---|---|---|
|  |  | MD (Machine Direction) | TD (Transverse Direction) |
| Example 7 | 135 | 550 | 560 |
| Comparative Example 4 | 141 | 530 | 540 |

Lower heat-seal temperature is advantageous in the industrial production from the viewpoint of energy-saving. Higher Young's modulus exhibits higher rigidity.

Industrial Applicability

The propylene-ethylene copolymers of the present invention are those wherein there are almost no inverted propylene units, the ethylene units are more randomly distributed and the molecular weight distribution is narrow, as shown in Table 1. Thus, the molded articles made from the propylene-ethylene copolymers of the present invention as a molding material have better heat resistance in the injection-molded articles and better stiffness and excellent low temperature heat-sealing characteristics in the films, as compared with the molded articles made from the propylene-ethylene copolymers having the same melting points which were produced by the prior art process using the titanium-containing catalysts. Therefore, the present copolymers will enable the expansion of limited use in the prior propylene-ethylene copolymers.

What is claimed is:

1. A propylene-ethylene copolymer comprising 0.01–15 mol % of an ethylene unit and 99.99–85 mol % of a propylene unit, characterized in that
   a) the chain structure determined by NMR has the following relationships, in the unit of three monomers sequence (triad) in the copolymer chain,
      a-1) the relationship between the ratio of propylene-ethylene-propylene sequence (PEP) and the content of all ethylene units (C2) is represented by equation (I)

$$0.0070 \times C2 - 0.0020 \leq PEP \leq 0.0070 \times C2 + 0.0130 \quad (I)$$

and
      a-2) the relationship between the ratio of three ethylenes sequence (EEE) and the content of all ethylene units (C2) is represented by equation (II)

$$0 \leq EEE \leq 0.00033 \times C2 + 0.0010 \quad (II)$$

a-3) a ratio ($N_{\alpha\beta}$) of all $\alpha,\beta$-methylene carbons to all propylene units is in the range of 0–1.2 mol %,
   b) a weight average molecular weight (Mw) is 50,000–1,500,000, and
   c) a ratio (Mw/Mn) of the weight average molecular weight (Mw) to a number average molecular weight (Mn) is 1.2–3.8.

2. The propylene-ethylene copolymer of claim 1 having the relationship between the melting point (Tm) of the copolymer and the content of all ethylene units (C2) in the copolymer which is represented by equation (III)

$$-8.1 \times C2 + 156.0 \leq Tm \leq -4.4 \times C2 + 165.0 \quad (III).$$

3. A process for the production of a propylene-ethylene copolymer comprising 0.01–15 mol % of an ethylene unit and 99.99–85 mol % of a propylene unit, in which
   a) the chain structure determined by NMR has the following relationships, in the unit of three monomers sequence (triad) in the copolymer chain,
      a1) the relationship between the ratio of propylene-ethylene propylene sequence (PEP) and the content of all ethylene units (C2) is represented by equation (I)

$$0.0070 \times C2 - 0.0020 \leq PEP \leq 0.0070 \times C2 + 0.0130 \quad (I)$$

and
      a-2) the relationship between the ratio of three ethylenes sequence (EEE) and the content of all ethylene units (C2) is represented by equation (II)

$$0 \leq EEE \leq 0.00033 \times C2 + 0.0010 \quad (II)$$

a-3) a ratio ($N_{\alpha\beta}$) of all $\alpha,\beta$-methylene carbons to all propylene units is in the range of 0–1.2 mol %,
   b) a weight average molecular weight (Mw) is 50,000–1,500,000, and
   c) a ratio (Mw/Mn) of the weight average molecular weight (Mw) to a number average molecular weight (Mn) is 1.2–3.8, characterized in that ethylene and propylene are copolymerized in the presence of a catalyst comprising a chiral transition metal compound and an aluminoxane, the transition metal compound being represented by formula (1)

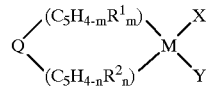

wherein M represents a transition metal selected from the group consisting of titanium, zirconium and hafnium; X and Y may be the same or different and each represents a hydrogen, a halogen or a hydrocarbyl radical; $(C_5H_{4-m}R^1_m)$ and $(C_5H_{4-n}R^2_n)$ represent a substituted cyclopentadienyl group in which $R^1$ and $R^2$ may be the same or different and each represents a hydrocarbyl radical of 1 to 20 carbons which may be joined with two carbon atoms on the cyclopentadienyl ring to form one or more hydrocarbon ring which may be substituted by a hydrocarbyl radical, or a silicone-containing hydrocarbyl radical; m and n are an integer of 1–3; and Q is a divalent group capable of linking $(C_5H_{4-m}R^1_m)$ and $(C_5H_{4-n}R^2_n)$, which is selected from the group consisting of a hydrocarbyl radical, an unsubstituted silylene group and a hydrocarbyl-substituted silylene group.

4. The process for the production of a propylene-ethylene copolymer of claim 3 wherein the chiral transition metal compound is the compound of formula (1) wherein M is zirconium or hafnium, X and Y are the same or different halogen atom or hydrocarbyl group, $R^1$ and $R^2$ are the same or different alkyl group of 1–20 carbons and Q is a dialkyl-silylene group.

5. A molded article made from a propylene-ethylene copolymer as a molding material, the copolymer comprising 0.01–15 mol % of an ethylene unit and 99.99–85 mol % of a propylene unit, in which
   a) the chain structure determined by NMR has the following relationships, in the unit of three monomers sequence (triad) in the copolymer chain,
      a-1) the relationship between the ratio of propylene-ethylene-propylene sequence (PEP) and the content of all ethylene units (C2) is represented by equation (I)

$$0.0070 \times C2 - 0.0020 \leq PEP \leq 0.0070 \times C2 + 0.0130 \quad (I)$$

and
      a-2) the relationship between the ratio of three ethylenes sequence (EEE) and the content of all ethylene units (C2) is represented by equation (II)

$$0 \leq EEE \leq 0.00033 \times C2 + 0.0010 \quad (II)$$

a-3) a ratio ($N_{\alpha\beta}$) of all $\alpha,\beta$-methylene carbons to all propylene units is in the range of 0–1.2 mol %,
   b) a weight average molecular weight (Mw) is 50,000–1,500,000, and
   c) a ratio (Mw/Mn) of the weight average molecular weight(Mw) to a number average molecular weight (Mn) is 1.2–3.8.

6. The molded article of claim 5 wherein the propylene-ethylene copolymer is subjected to injection molding.

7. The molded article of claim 5 wherein the propylene-ethylene copolymer is subjected to extrusion molding.

8. The molded article of claim 5 wherein the molded article is film.

* * * * *